T. C. DOBBINS.
SHAFT COUPLING.
APPLICATION FILED NOV. 6, 1920.
1,416,341. Patented May 16, 1922.
2 SHEETS—SHEET 1.
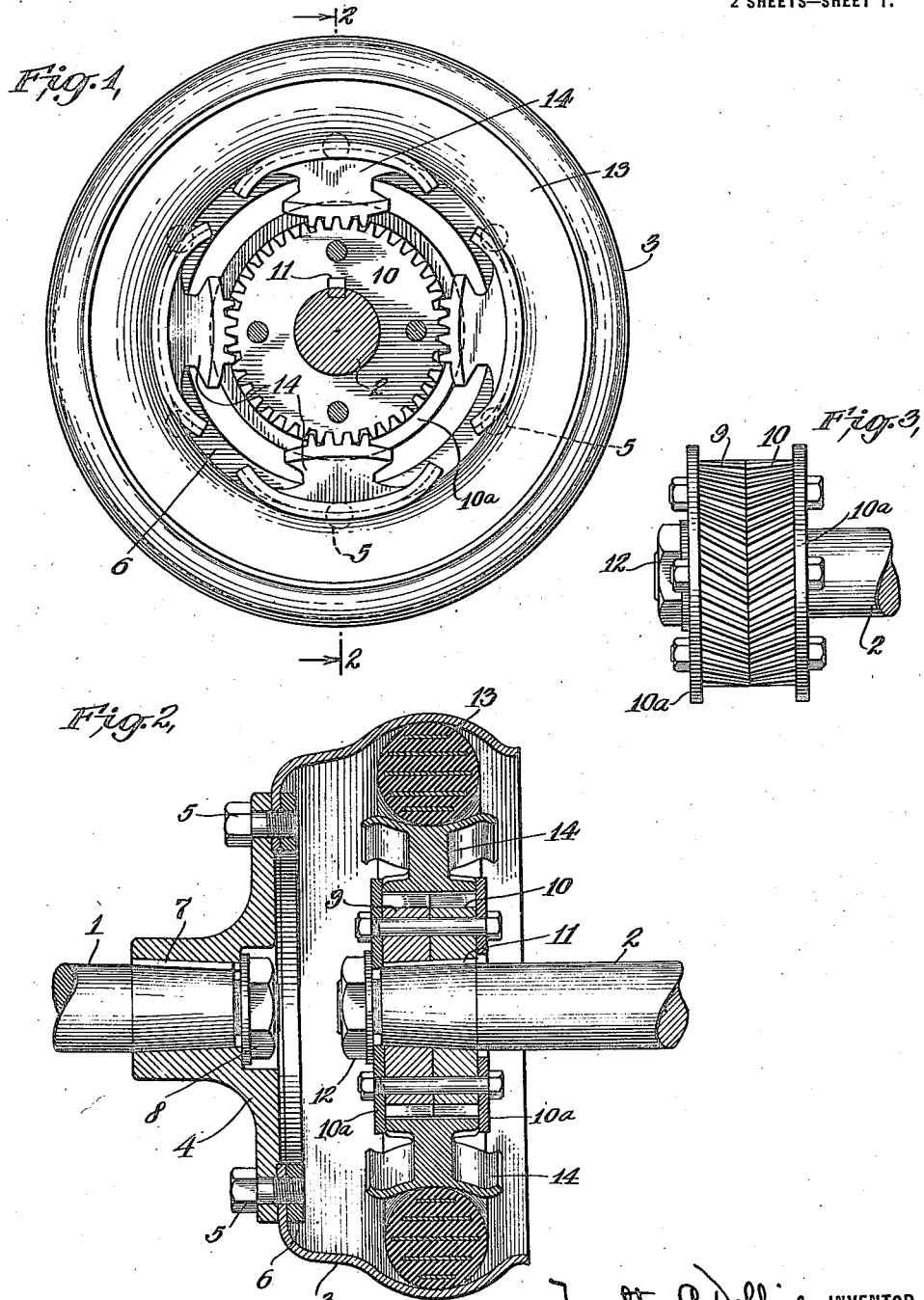

T. C. DOBBINS.
SHAFT COUPLING.
APPLICATION FILED NOV. 6, 1920.
1,416,341. Patented May 16, 1922.
2 SHEETS—SHEET 2.
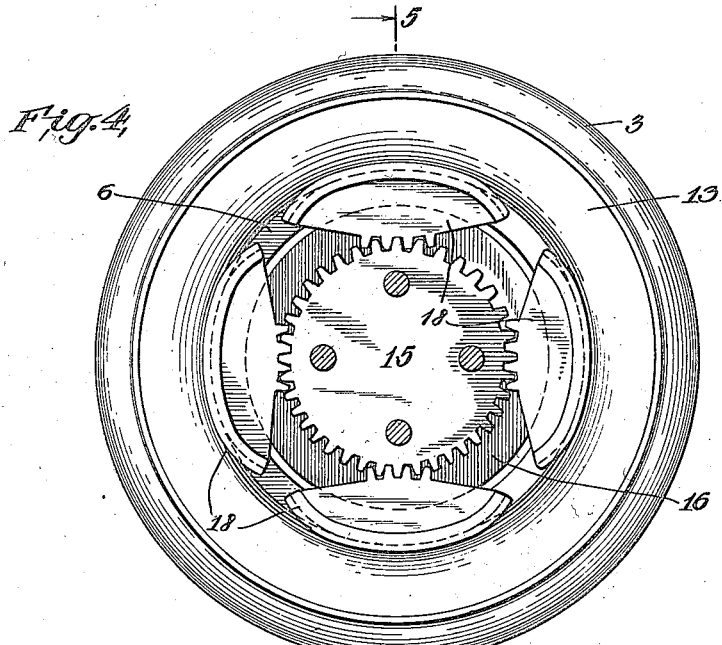
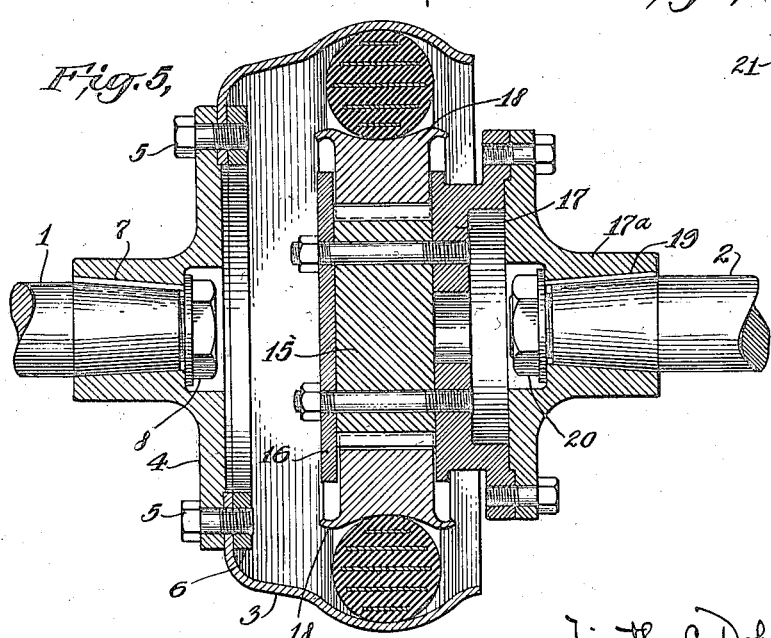
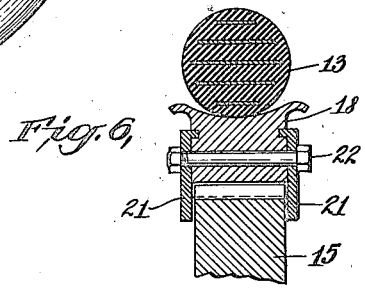
Timothy C. Dobbins INVENTOR
BY
Frederick S. Duncan ATTORNEY

UNITED STATES PATENT OFFICE.

TIMOTHY C. DOBBINS, OF DENVER, COLORADO.

SHAFT COUPLING.

1,416,341.     Specification of Letters Patent.     Patented May 16, 1922.

Application filed November 6, 1920. Serial No. 422,148.

*To all whom it may concern:*

Be it known that I, TIMOTHY C. DOBBINS, a citizen of the United States, residing at Denver, in the State of Colorado, have invented certain new and useful Improvements in Shaft Couplings, of which the following, taken in connection with the accompanying drawings, is a specification.

The invention relates to shaft couplings of the so-called universal type, which are characterized by an adaptability for permitting power to be transmitted through two coupled shaft sections which are angularly disposed with respect to each other.

One object of the invention is a construction of a coupling of the above described type which will not require lubrication.

Another object is the construction of a coupling of the same type that will permit of end thrusts of the connected shaft sections.

Another object is the construction of a coupling that will be cheap to manufacture and easily assembled and disassembled.

Another object is the construction of a coupling more particularly of the type above described which will partially absorb the torque of the driving shaft or the resistance to torque of the driven shaft when power is initially applied or when the driven shaft encounters sudden and momentary resistance to rotation.

Another object is the construction of a universal coupling which will produce a minimum of noise and vibration.

More specifically my invention also involves an improved mounting for the rocker shoes of the coupling illustrated and described in my United States Letters Patent No. 1,147,620, issued July 20, 1915.

Another specific object is to prevent the rocker shoes from being dislocated by end thrusts of the shaft sections, angular displacement of the shaft sections, or accidental causes.

Another object is to provide a mounting for the rocker shoes of the coupling shown in my Patent No. 1,147,620, which will be especially resistant to wear.

Referring to the drawings:

Figure 1 is an end view of one form of the coupling;

Figure 2 is an elevation partly in section on the line 2—2 of Figure 1;

Figure 3 is a detailed view of one form of gear on which the rocker shoes are mounted;

Figure 4 is an end view of a modification of the coupling shown in Figure 1;

Figure 5 is an elevation partly in section on the line 5—5 of Fig. 4.

Figure 6 is a detailed view of still another modification.

Referring to Figures 1, 2 and 3, the numerals 1 and 2 indicate two shaft sections shown in this instance as in approximate alignment. One of these shaft sections, for example that indicated by the numeral 1, carries a ring or circular housing 3, the ring being for convenience of manufacture and assembling and disassembling, connected to the shaft through the medium of the collar 4. Suitable means of connecting the ring to the collar are provided, such for example as the bolts 5 and the annular plate 6, the latter serving to give additional strength to the union between the ring and the collar. The collar may be fixedly retained on the shaft by any suitable means, such as by the key 7 and the nut 8.

The other shaft section 2 carries in this instance a fish-bone gear, which may be composed of two complementary sections, 9 and 10, and the unit is fixedly mounted on the shaft section 2 by any suitable means, such as the key 11 and the nut 12. If desired the gear may be provided with flanges $10^a$, $10^a$, which assist in preventing the rockers hereinafter mentioned from being dislocated from engagement with the gear.

The inner perimeter of the ring 3 is preferably formed in the shape of an annular groove which acts as a seat for the resilient annular body or element 13. This element may be composed of any suitable material, such as rubber, and constructed in such way as to act as a cushion which will cooperate with the rocker shoes 14. The number of rocker shoes is not invariable, but in the particular construction shown four are employed, this number having been found by experience to answer the requirements. The rockers 14 are provided with fish-bone teeth to mesh with the teeth of the fish-bone gear, and the shoes of the rockers are grooved to partially surround the resilient element 13 whereby the latter is compressed and retained more or less firmly between the shoes and the grooved seat in the inner perimeter of the ring 3.

The radius of transverse curvature of the groove in the ring and also of the grooves in the shoes may be varied to suit different conditions, but under many conditions, such for example as in automobile construction, it is preferable that the radius of curvature of these two elements be greater than the cross-section radius of the resilient element 13. This particular feature of the device is reserved for further application for Letters Patent.

For most advantageous results it is desirable that the resilient element be at all times, even while the coupling is not subjected to torque, under a considerable degree of compression. The desired compression may be effected by so proportioning the parts that it is brought about by the mere assembling of the coupling.

In operation, with the shaft sections angularly disposed with respect to each other, it is obvious that the resilient element 13 will roll in the grooves between which it is compressed as the coupling turns and that it will conform itself to continuously changing angles such, for instance, as occur in the normal operation of the transmission shaft of an automobile. As has been heretofore stated, it is preferable that the parts be so proportioned that there will normally be considerable compression of the resilient element 13. This normal degree of compression should be sufficient to prevent the resilient element from axially revolving in its seat and also to prevent the shoes from slipping along the resilient element when torque is applied to either shaft; in other words it should be such that the ends of the shoes will be caused to still further compress or bite into the resilient element when torque is applied to one of the shafts. The action of the device may properly be described as that of a number of toggles, each rocker forming one arm of a toggle, and the gear the other, the joint being formed by the gear teeth connections. It should be noted that the resilient member need not be continuous nor solid nor a single piece structure, it being merely essential that there be proper resiliency under each shoe; nor is it indispensable that the shoes be upon the inner member or gear and the resilient member seated in the ring, nor that the action be based on the toggle principle, the essential being that the shoes carried by one member should, when torque is applied to one of the shafts, be forced radially so that there is a progressive compression of the resilient member.

Another action also takes place that performs the important function of distributing wear on the resilient element. As torque on the shafts is reduced to zero each shoe is by virtue of the resiliency of the member 13, restored to normal position. The process of restoration to normal position causes each shoe to take a position slightly rearwardly of the position which it occupied when torque was applied. There is therefore a slow, gradual creeping of the shoes about the resilient member, which has the obvious consequence of evenly distributing the wear between them.

It will also be noted that the employment of the fish-bone gear even without the flanges 10$^a$, 10$^a$, prevents lateral play of the rockers, that is, play axially of the fish-bone gear, and likewise prevents the rockers from creeping about the periphery of the gear and thus disarranging themselves from predetermined spaced relation. The use of the flanges, however, establishes a margin of safety against axial play which is usually desirable.

In the form shown in Figures 4 and 5 there is substituted for the fish-bone gear an ordinary rectangular gear 15, also preferably provided with flanges, one of which may consist of the plate 16 and the other of the plate 17, the latter through the medium of the collar 17$^a$, also acting as a means of connection with the shaft 2. The rockers 18 accompanying this type are provided with gear teeth conforming to the teeth of the gear 15, and it will be obvious that lateral motion of the rockers, whether or not the shafts are angularly disposed, is prevented by the flanges. The collar 17$^a$ may be rigidly fixed to the shaft 2 by the key 19 and the nut 20.

In still another modification shown in Figure 6, the lateral movement of the rockers with respect to the gear is prevented by the flanges 21, fastened to the rockers by bolts 22. In other respects the gear connection may be similar to that shown in Figures 4 and 5.

Having thus described my invention, and with the knowledge that changes and modifications may be made that nevertheless come within the scope thereof, although not actually shown or described herein, I claim:

1. The combination with a shaft and a ring fixed to the shaft and concentric therewith, of a resilient cushioning element seated in said ring, a second shaft, a gear carried by said second shaft, a plurality of rocker shoes, meshing with said gear and engaging said cushioning element and adapted to compress the cushioning element progressively as they rock from normal position.

2. In a shaft coupling, the combination with a gear fixed to one shaft, of a member encircling and spaced from the said gear and fixed to the second shaft, eccentrically mounted devices mounted in the space between said gear and said member and meshing with said gear, and a compressible resilient device extending from each of said devices to said member.

3. The combination with a shaft and a gear mounted thereon, of a second shaft, a second distinct coupling member mounted on said second shaft and encircling said gear in spaced relation therewith, a resilient compressible member lying between said gear and said second member and resting against one of them, and a series of rocking shoes meshing with said gear and adapted to rock against said resilient member.

4. In a shaft coupling two concentrically disposed coupling members, so proportioned as to provide an annular space between the outer perimeter of the one and the inner perimeter of the other, one of said perimeters being provided with gear teeth and the other with a resilient compressible surface, and a plurality of rocker shoes meshing with said gear teeth and compressing said surface.

5. In a shaft coupling which includes two concentrically disposed coupling members so proportioned as to provide an annular space between the outer perimeter of one and the inner perimeter of the other, rocker shoes disposed on one of said perimeters and engaging therewith by means of gear teeth connections, and a resilient compressible device extending from the working face of each of said shoes to the other perimeter.

6. In a shaft coupling, which includes two concentrically disposed coupling members, so proportioned as to provide an annular space between the outer perimeter of one and the inner perimeter of the other, gear teeth on said outer perimeter, rocker shoes mounted on said outer perimeter and meshing therewith, and an annular compressible resilient body seated in the said inner perimeter and engaging the working faces of said shoes.

7. The combination with a shaft and a ring fixed to the shaft and concentric therewith, of a resilient cushioning element seated in said ring, a second shaft, a gear carried by said second shaft, said gear being provided with means for preventing axial movement thereof with relation to another gear meshing therewith, a plurality of rocker shoes meshing with said gear and engaging said cushioning element and adapted to compress the resilient member progressively as they rock from normal position.

8. The combination with a shaft and a ring fixed to the shaft and concentric therewith, of a resilient cushioning body seated in said ring, a second shaft, a gear carried by said second shaft, a plurality of rocker shoes meshing with said gear and engaging said cushioning body and adapted to compress the same progressively as they rock from normal position, and means for preventing axial movement of said rocker shoes with respect to said gear.

9. The combination with a shaft and a ring fixed to the shaft and concentric therewith, of a resilient cushioning body seated in said ring, a second shaft, a fish-bone gear carried by said second shaft, a plurality of rocker shoes meshing with said gear and engaging said cushioning element, and adapted to compress the cushioning element progressively as they rock from normal position.

10. The combination with a shaft and a ring fixed to the shaft and concentric therewith, of a resilient cushioning body seated in said ring, a second shaft, a fish-bone gear composed of a plurality of complementary sections carried by said second shaft, a plurality of rocker shoes meshing with said gear and engaging said cushioning element and adapted to compress the resilient element progressively as they rock from normal position.

11. A shaft coupling comprising a fishbone gear, a ring provided with a groove in its inner perimeter, said perimeter being greater than the perimeter of said gear, a plurality of rockers mounted on the perimeter of said gear and meshing therewith, grooved shoes carried by said rockers, said shoes being opposed to the said groove in said ring, and a resilient body normally under compression between said shoes and said ring.

12. In a shaft coupling a coupling member comprising a ring, a resilient cushioning device seated in the interior perimeter of said ring, a second coupling member provided with gear teeth arranged thereon on the circumference of a circle, said circle being concentric with said ring, rockers mounted on said second coupling member and meshing with said teeth, and shoes on said rockers bearing against said cushioning element.

13. In a shaft coupling an annular coupling member, a second coupling member provided with gear teeth arranged thereon on the circumference of a circle, said circle being concentric with said ring and of less diameter, rocking devices engaging said gear teeth, and a compressible resilient device extending from each rocking device to the inner perimeter of said annular member.

14. In a shaft coupling an annular coupling member, a second coupling member provided with gear teeth disposed thereon on the circumference of a circle, said circle being concentric with said annular member and of less diameter, rocking devices engaging said gear teeth, means for preventing play of said rocking devices axially of said annular member, and a compressible resilient device extending from each rocking device to the inner perimeter of said annular coupling member.

15. In a shaft coupling an annular coupling member, a second coupling member provided with fish-bone teeth disposed thereon on the circumference of a circle, said circle being concentric with said annular member and of less diameter, rocking devices engaging said gear teeth and a compressible resilient device extending from each rocking device to the inner perimeter of said annular member.

16. In a shaft coupling an annular coupling member, a second coupling member sections of the perimeter of which are provided with gear teeth located in the plane of said annular member, rocking devices engaging said teeth, and a compressible resilient device extending from each rocking device to said resilient device.

17. In a shaft coupling an annular coupling member, a second coupling member sections of the perimeter of which are provided with gear teeth located in the plane of said annular member, rocking devices engaging said teeth, a compressible resilient device extending from each rocking device to said resilient device, and flanges adapted to prevent play of said rocking devices axially of said second coupling member.

18. In a shaft coupling an annular coupling member, a second coupling member sections of the perimeter of which are provided with gear teeth located in the plane of said annular member, rocking devices engaging said teeth, a compressible resilient device extending from each rocking device to said resilient device, said second coupling member being provided with radially projecting flanges whereby lateral play of said rocking devices with respect to said second coupling member is prevented.

19. In a shaft coupling, a coupling member carrying inwardly projecting resilient cushion devices, a second coupling member within the first and provided with radially projecting gear teeth, rocking devices engaging said gear teeth and provided with shoes engaging said cushioning devices.

20. In a shaft coupling, a coupling member, a second coupling member within the first and annularly spaced from the first, resilient cushioning devices within the space thereby formed seated on one of said members, gear teeth on the other of said members projecting in the direction of said cushioning devices, and rocking devices mounted on said gear teeth, said rocking devices being provided with shoes which engage said resilient devices.

In testimony whereof, I have signed this specification.

TIMOTHY C. DOBBINS.